US008807821B2

(12) United States Patent
Umsonst-Kübler

(10) Patent No.: US 8,807,821 B2
(45) Date of Patent: Aug. 19, 2014

(54) DEVICE FOR MIXING A COMPOUND IN A CONTAINER

(76) Inventor: Petra Umsonst-Kübler, Baden-Baden (DE)

(*) Notice: Subject to any disclaimer, the term of this patent is extended or adjusted under 35 U.S.C. 154(b) by 1027 days.

(21) Appl. No.: 12/811,587

(22) PCT Filed: Dec. 16, 2008

(86) PCT No.: PCT/EP2008/010724
§ 371 (c)(1),
(2), (4) Date: Jul. 2, 2010

(87) PCT Pub. No.: WO2009/083141
PCT Pub. Date: Jul. 9, 2009

(65) Prior Publication Data
US 2010/0284243 A1  Nov. 11, 2010

(30) Foreign Application Priority Data

Jan. 3, 2008 (DE) .................. 10 2008 003 941
Jun. 23, 2008 (DE) .................. 10 2008 030 623

(51) Int. Cl.
A47J 43/27 (2006.01)

(52) U.S. Cl.
USPC ........ 366/130; 366/243; 366/276; 222/196.5; 206/219

(58) Field of Classification Search
USPC ............ 366/130, 243–248, 276–277; 99/287; 222/196.5, 199; 206/219, 220
See application file for complete search history.

(56) References Cited

U.S. PATENT DOCUMENTS

| 1,068,450 | A | * | 7/1913 | Roberts | 403/247 |
| 1,165,307 | A | * | 12/1915 | Baltzley | 366/243 |
| 1,177,295 | A | * | 3/1916 | Beckner et al. | 366/242 |
| 1,237,585 | A | * | 8/1917 | Tripke | 366/243 |
| 1,238,461 | A | * | 8/1917 | Tripke | 366/243 |
| 1,282,148 | A | * | 10/1918 | Tripke | 366/243 |
| 1,415,334 | A | * | 5/1922 | Gibson | 416/65 |
| 1,931,087 | A | * | 10/1933 | Schwarz et al. | 222/196.5 |
| 1,948,431 | A | * | 2/1934 | Rolph | 366/243 |
| 2,162,348 | A | * | 6/1939 | Hacmac | 366/243 |
| 2,749,098 | A | * | 6/1956 | Johnson | 366/243 |
| 3,009,686 | A | * | 11/1961 | Kaplan | 366/276 |
| 3,339,476 | A | * | 9/1967 | De Troya | 99/287 |
| 3,738,535 | A | * | 6/1973 | Nicholls | 222/137 |

(Continued)

FOREIGN PATENT DOCUMENTS

| CA | 2 310 180 | 11/2001 |
| DE | 203 07 684 | 8/2003 |
| DE | 102006014471 A1 * | 10/2007 |
| EP | 0 888 811 | 1/1999 |

OTHER PUBLICATIONS

International Search Report, issued Apr. 16, 2009, for PCT International Application No. PCT/EP2008/010724.

Primary Examiner — Charles E Cooley
(74) Attorney, Agent, or Firm — Pearl Cohen Zedek Latzer Baratz LLP

(57) ABSTRACT

A device for mixing a liquid present in a container is provided with a threaded spindle that can be attached in the container, a body that is provided with an internal thread and can be moved by pivoting about a horizontal axis along the threaded spindle being disposed on the threaded spindle. The body is provided with mixing and/or stirring elements substantially protruding in the radial direction.

7 Claims, 3 Drawing Sheets

(56) References Cited

U.S. PATENT DOCUMENTS

| | | | |
|---|---|---|---|
| 3,744,767 A * | 7/1973 | Blasnik | 366/243 |
| 3,774,816 A * | 11/1973 | Bratton | 222/391 |
| 3,907,459 A * | 9/1975 | Guedel | 416/65 |
| 4,408,690 A * | 10/1983 | Ferrero | 206/222 |
| 5,071,040 A * | 12/1991 | Laptewicz, Jr. | 222/235 |
| 5,842,785 A * | 12/1998 | Brown et al. | 366/139 |
| 5,857,772 A * | 1/1999 | Washington | 366/243 |
| 6,095,676 A | 8/2000 | Kuan | |
| 6,324,967 B1 * | 12/2001 | Robinson | 99/297 |
| 6,367,962 B1 * | 4/2002 | Mizutani et al. | 366/189 |
| 6,431,743 B1 * | 8/2002 | Mizutani et al. | 366/189 |
| 6,523,994 B2 * | 2/2003 | Lawson | 366/199 |
| 6,550,957 B2 * | 4/2003 | Mizutani et al. | 366/189 |
| 6,592,247 B1 * | 7/2003 | Brown et al. | 366/139 |
| 6,729,500 B1 | 5/2004 | Dobbs | |
| 7,441,941 B2 * | 10/2008 | Vernon | 366/130 |
| 7,661,563 B2 * | 2/2010 | De Lataulade | 222/244 |
| 7,946,752 B2 * | 5/2011 | Swartz et al. | 366/247 |
| 8,152,361 B2 * | 4/2012 | Swartz et al. | 366/243 |
| 2002/0118596 A1 * | 8/2002 | Mizutani et al. | 366/189 |
| 2003/0218935 A1 | 11/2003 | Hu | |
| 2007/0056447 A1 * | 3/2007 | Swartz et al. | 99/287 |
| 2008/0259723 A1 * | 10/2008 | Rhodes et al. | 366/247 |
| 2010/0284243 A1 * | 11/2010 | Umsonst-Kubler | 366/185 |
| 2012/0043406 A1 * | 2/2012 | Klotz et al. | 241/277 |
| 2013/0010568 A1 * | 1/2013 | Bodum | 366/130 |
| 2013/0228482 A1 * | 9/2013 | Son | 206/219 |
| 2013/0279287 A1 * | 10/2013 | Cerasani | 366/130 |

* cited by examiner

DEVICE FOR MIXING A COMPOUND IN A CONTAINER

CROSS-REFERENCE TO RELATED APPLICATIONS

This application is a National Phase Application of PCT International Application No. PCT/EP2008/010724, International Filing Date Dec. 16, 2008, claiming priority of German Patent Application No. 10 2008 003 941.1, filed Jan. 3, 2008, and German Patent Application No. 10 2008 030 623.1, filed Jun. 23, 2008, both of which are incorporated by reference herein.

FIELD OF INVENTION

The invention relates to a device for mixing a compound present in a container, in particular a liquid.

BACKGROUND OF THE INVENTION

Liquids composed of two or more different liquids with or without solid matter are provided for example in the form of salad dressings. The different liquids, for example oil and vinegar, have the tendency to separate. Equally, more solid parts in particular of such mixtures of liquids have the tendency to settle at the bottom of the container. Similar problems apply in paints, for example paints with glitter effects, oil mixtures of combinations with high and lower densities, and in the pharmacological or cosmetic field. If these liquids are to be used, they must as a rule be mixed before being taken out or poured. If such mixtures of liquids of differing components are to be used by pouring them out, for example by pouring salad dressing out of a bottle-like container, there is a risk that the user will forget the mixing. In this case, he will only pour out the liquid component that has separated to the top. To achieve mixing, it is usual to shake the bottle with the liquid.

The problem underlying the invention is to provide a device of the type mentioned at the outset that permits mixing without the need to shake the container.

This problem is solved in that a threaded spindle that can be attached inside the container is provided, on which is arranged a body provided with an internal thread that can be moved by pivoting it about a horizontal axis along the threaded spindle, said body being provided with mixing and/or stirring elements protruding substantially in the radial direction. The body, which preferably has a relatively large mass, moves along the threaded spindle when the container with the threaded spindle is pivoted by more than 90° about a horizontal axis. Because of the threaded spindle and the internal thread, the body is set into a rotary motion so that it mixes the liquid using its mixing and/or stirring elements as it moves along the threaded spindle.

In an embodiment of the invention, it is provided that the threaded spindle contains a single-start or multi-start thread with a pitch varying in the axial direction. As a result, the speed with which the body moves in the axial direction and with which it rotates can be influenced.

In an embodiment of the invention, it is provided that the threaded spindle is arranged aligned with a pouring opening of a container. The pouring opening preferably contains a labyrinth-like channel. With this embodiment, pouring out whereby the container is pivoted from a vertical position by more than 90° about a horizontal axis is combined with a mixing or stirring effect without the user having to think about it. Since the pouring speed is limited by the labyrinth-like channel, it is ensured that mixing already takes place before the required quantity of liquid has been poured out.

In another embodiment, it is provided that the threaded spindle is designed tubular and connected at one end to a pumping or metering valve. In this embodiment, it is usually sufficient to pivot the container once or twice about a horizontal axis in order to achieve a good mixing. Then the pumping or metering valve can be actuated, with the liquid being sucked in and then dispensed by the tubular threaded spindle.

In a further embodiment of the invention, it is provided that the threaded spindle and the body provided with mixing and/or stirring elements form an assembly group with the pumping or metering valve or with the elements of a pouring opening, said assembly group being insertable into an opening of the container.

To limit the pouring speed, a strainer can also be arranged in the pouring opening. It is also possible to combine a labyrinth-like channel with the arrangement of a strainer. It is also advantageous when a mixing chamber is arranged in front of the outlet of the pouring opening. This ensures an even better mixing, in particular at the start of pouring.

It is expedient to assign a removable closure element to the pouring opening. This allows turning of the container by more than 90° about a horizontal axis and in particular turning it upside-down without the liquid it contains running out. In this way, it is possible by repeated pivoting to achieve a particularly intensive mixing.

In a further embodiment of the invention, a window is provided on the container that extends substantially over its full height. This window forms a level indicator. A scale is advantageously assigned to the window (on or inside the window or on the wall beside the window), so that a counter function for the metered quantities is also possible.

If the container is provided with a pumping or metering valve that is connected to the tubular threaded spindle, no liquid can exit without actuation of the pumping or metering valve. The container can thus be turned one or more times by 180° without the liquid running out. With this embodiment, it is further provided that the pumping or metering valve is covered by a cap attachable to the container and designed as the pedestal for the container. To dispense liquid from this container using the pumping or metering valve, the container must then be turned by about 180° so that mixing of the liquid is achieved without the user having to devote any thought to this.

BRIEF DESCRIPTION OF THE DRAWINGS

Further features and advantages of the invention can be gathered from the following description of the embodiments shown in the drawings and sub-claims.

DETAILED DESCRIPTION OF THE INVENTION

Figure 1:
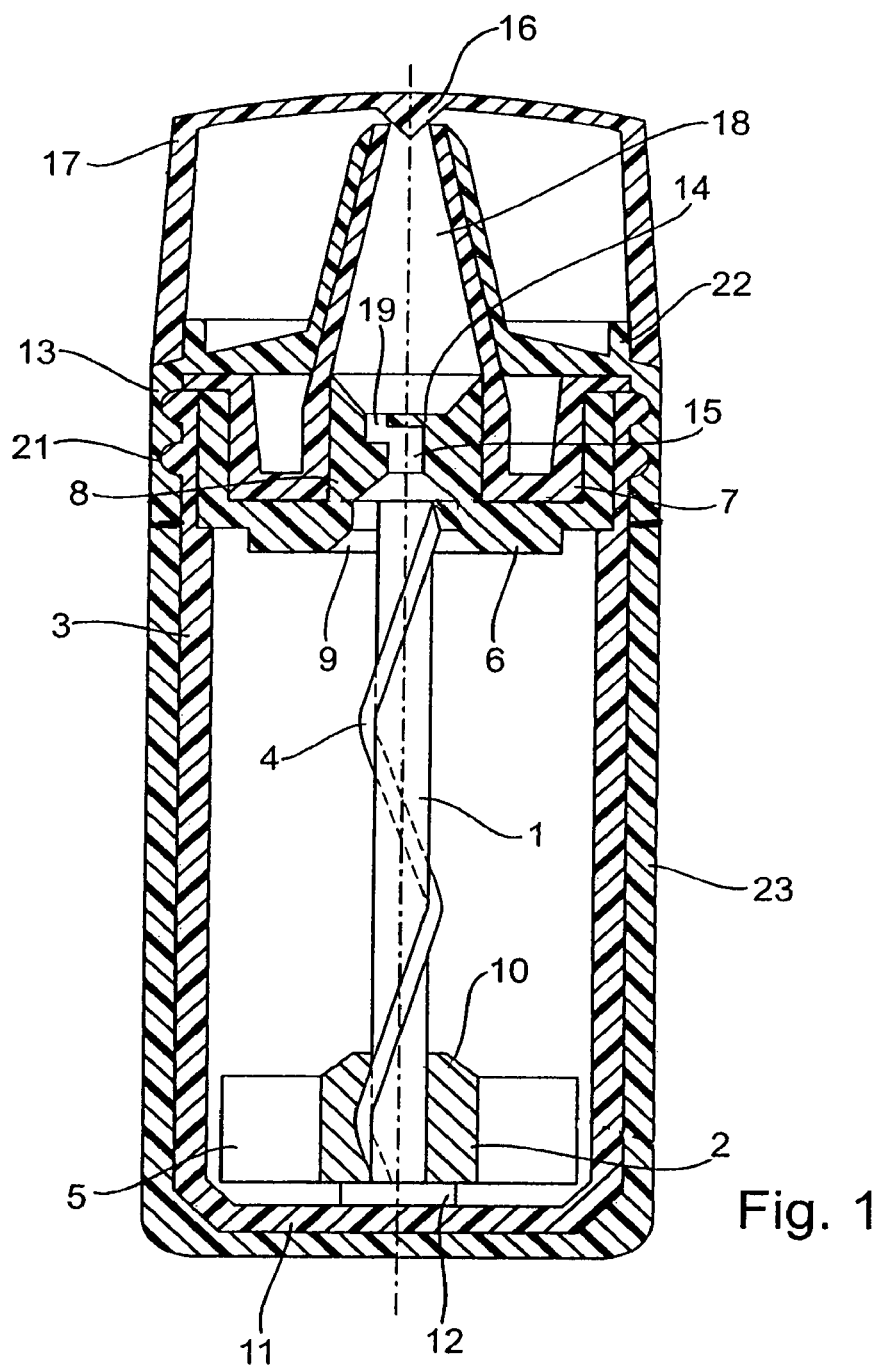
FIG. 1 shows an axial section through a container with a pouring opening and a device in accordance with the invention for mixing.

The embodiment shown in FIG. 1 is a substantially cylindrical container 3 open at the top. A closure bottom 6 designed approximately in cup form is inserted into the open end of the container 3. The closure bottom 6 is provided with a central opening. An outlet element 7 provided with a outlet tapering conically upwards to an pouring opening is inserted into the approximately cup-like closure bottom 6. The closure bottom 6, the outlet element 7 and the container 3 are held together by a closure element 13 that grips around the upper end of the container 3 by a collar provided with internal thread and is screwed onto an external thread 21 at the top area of the container 3. The closure element 13 is provided with a conical attachment that grips around the conical outlet area of the outlet element 7. The outlet element 7 forms a mixing chamber 18 inside the conical area.

For the outlet mouth of the outlet element 7, a sealing element in the form of a sealing cone 16 is provided that belongs to a cap 17 fitted on the outside onto a collar 22 of the closure element 13. The collar 22 forms on the inside a drip rim in which any liquid drops can be collected.

A threaded spindle 1 is stationarily attached to the closure bottom 6 and is provided with a steep-pitch thread 4. A body 2 provided with a corresponding internal thread is guided on this threaded spindle 1. The body 2, manufactured for example from special steel, has a relatively high mass. It is provided with mixing and/or stirring elements 5 protruding substantially radially from it and which can be vanes, brushes, teeth or needles. That side of the body 2 facing the closure bottom 6 is provided with a sealing element, preferably a sealing cone 10, assigned to a sealing surface, preferably a sealing cone 9 of the closure bottom 6.

The threaded spindle 1 is inserted into a holder of the closure bottom 6. The opposite end of the threaded spindle 1 is provided with a stop 12 opposite the bottom 11 of the container 3.

Adjoining the central opening of the closure bottom 6 is an insert 8 serving to slow down the pouring speed. The insert 8 receives for example one or more strainer inserts 15 and/or contains a labyrinth-like channel 19 for determining the pouring speed or outflow speed of a liquid.

In the embodiment, the container 3 is surrounded by an external housing 23 which serves decorative purposes and can comprise for example glass, plastic, special steel or the like.

The container 3 is filled with a liquid preferably comprising a mixture of two or more liquids which may additionally contain solid or suspended matter or the like. The upright container is then closed by the closure bottom 6, to which the threaded spindle 1 and the body 2 with the mixing or stirring elements 5 are attached. Then the insert 8, the outlet element 7 and the closure element 13 are attached so that the container 3 is closed.

When the cap 17 is removed and the container 3 is pivoted about a horizontal axis by more than 90° out of the vertical position as shown, the liquid present in the container 3 flows via the opening of the closure bottom 6, the strainer and the outlet channels into the mixing chamber 18 and then out of the pouring mouth. Due to the pivoting, the body 2 leaves its position and moves under gravity along the threaded spindle 1 to the closure bottom 6. In so doing, it is set into a rotary motion so that stirring and/or mixing of the liquid takes place. As soon as the body 2 contacts with its sealing element 10 the sealing surface 9 of the closure bottom 6, the pouring process ends. As a result, metering is achieved thanks to limitation of the liquid dispensable by once-only pivoting.

The threaded spindle 1 has a thread helix 4 with a relatively steep pitch, so that the body 2 makes only one or a few revolutions on its way from the stop 12 in the area of the bottom 11 of the container 3 to the closure bottom 6. It is provided in the embodiment shown that the thread helix 4 has a uniform pitch. In a modified embodiment, it is provided that the pitch of the thread helix 4 varies in the longitudinal direction of the threaded spindle 1. The body 2 then moving during pivoting of the container 3 on the threaded spindle 1 then rotates at differing speeds depending on the pitch of the thread helix.

In the embodiment shown, the container 3 is used to hold liquid. The external housing 23 has in this case only a protective and/or decorative function. In a modified embodiment, a basket-like structure is provided instead of a container 3 so that the external housing 23 then acts as the container receiving the liquid. The external housing 23 can have any required form. It only has to have an upper opening into which the pouring unit can be inserted in sealing manner. The pouring unit is then designed as a single structural unit than can be fitted onto different containers.

In the embodiment shown, only one threaded spindle 1 with only one body 2 guided thereon is provided. In modified embodiments of the invention, two or more threaded spindles are provided that each receive one body. In another embodiment, the threaded spindle has in the axial direction several sections limited by stops on which the respective bodies with mixing and/or stirring elements are guided. The sections can have different thread pitches so that the bodies move at different speeds along the respective sections of the threaded spindle and in so doing rotate at different speeds when the container is pivoted by more than 90° from the vertical position.

Pouring units with one threaded spindle having several sections and several bodies guided thereon are used in particular when large-volume containers are provided that have a volume of one liter or more.

The application of the pouring unit in accordance with the invention is for example in the home, in particular as a salad dressing mixer as a table-mounted appliance with a capacity from 0.1 to 1.0 liters, or also for use with a larger capacity, for example at self-service salad buffets. Furthermore, the pouring system can also be used as a paint mixer or the like or as an oil mixer, as well as in the pharmaceutical or cosmetic fields for pouring and application of liquids having different densities and/or different consistencies.

The individual parts of the pouring unit can made of plastic and/or steel, in particular stainless steel, or glass or ceramics or the like. They can be easily separated from one another and reassembled to permit cleaning.

Figure 2:
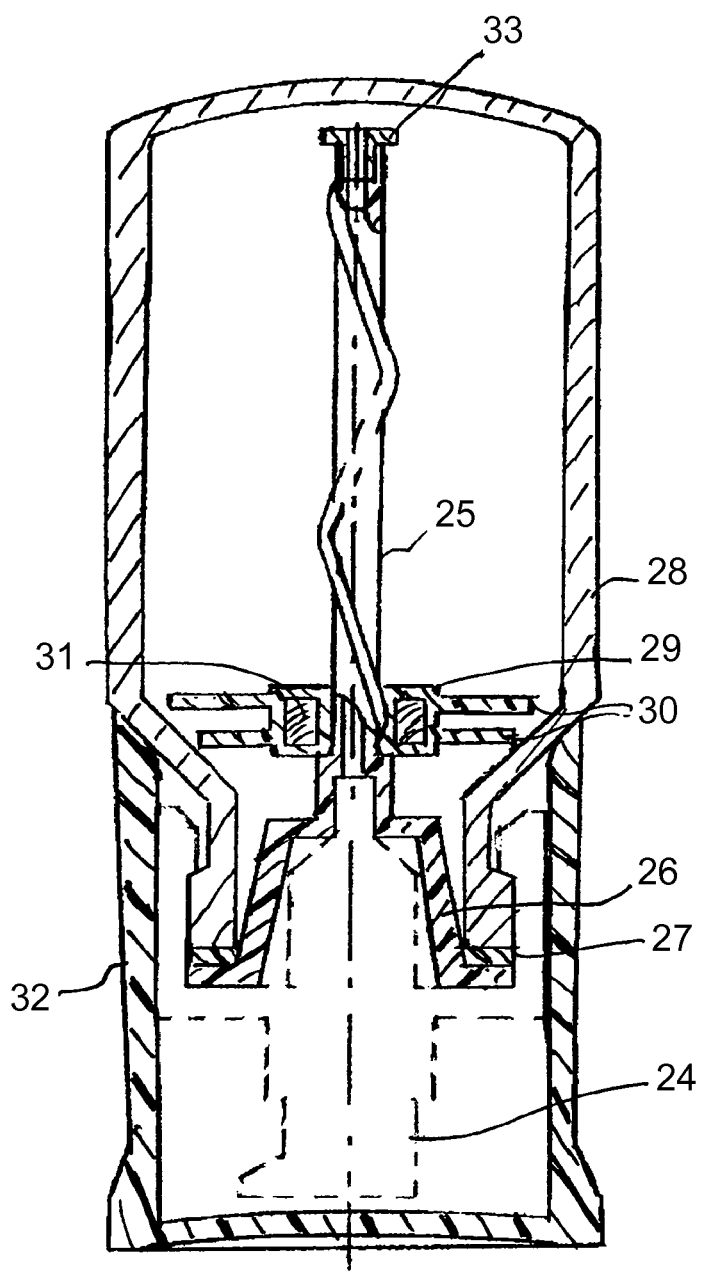
FIG. 2 shows an axial section through a container designed as a disposable article with a device in accordance with the invention for mixing and with a pumping or metering valve.

In the embodiment according to FIG. 2, a device in accordance with the invention for mixing is combined with a pumping and metering valve 24. The pumping and metering valve 24 is a known element shown only by a dashed line in the drawing. The threaded spindle 25 is, in the embodiment according to FIG. 2, provided with a cup-like attachment having an all-round annular flange. This cup-like attachment 26 is fitted onto the neck of a disposable bottle 28 with a sealing ring 27 inserted between them. The pumping and metering valve 24 has a collar fitted and clipped on the outside onto the neck of the disposable bottle 28. The threaded spindle is designed hollow so that it can act as the suction channel for the adjoining pumping and metering valve 24. A body 29 provided with an internal thread is guided on the threaded spindle 2 and is provided with outward-protruding mixing and/or stirring elements 30. The mixing or stirring elements 30 are elastically shapeable so that the body 29 can be inserted through the smaller-diameter neck of the disposable bottle 28 into the interior of the latter. The body 29 is made from plastic and heavier elements, for example metal elements 31 or a metal ring, are embedded inside it to increase its mass.

The pumping or metering valve 24 is covered by a cap 32 which is designed with one end as its pedestal so that the disposable bottle 28 can be set down and stored such that its pumping or metering valve 24 is at the bottom. When the disposable bottle 28 is picked up and the cap 32 removed, it is turned 180° into the position for use. This movement results in the body 29 with the mixing or stirring elements 30 moving in the axial direction on the threaded spindle 25 and at the same time rotating, so that the contents of the disposable bottle 28 are mixed. To do so, the person using the disposable bottle does not have to devote any particular thought to this. When the pumping or metering valve 24 is operated, the liquid is sucked in via the hollow threaded spindle 25. The hollow threaded spindle is provided at its free end with an insert 33 that limits the movement of the body 29.

Figure 3:
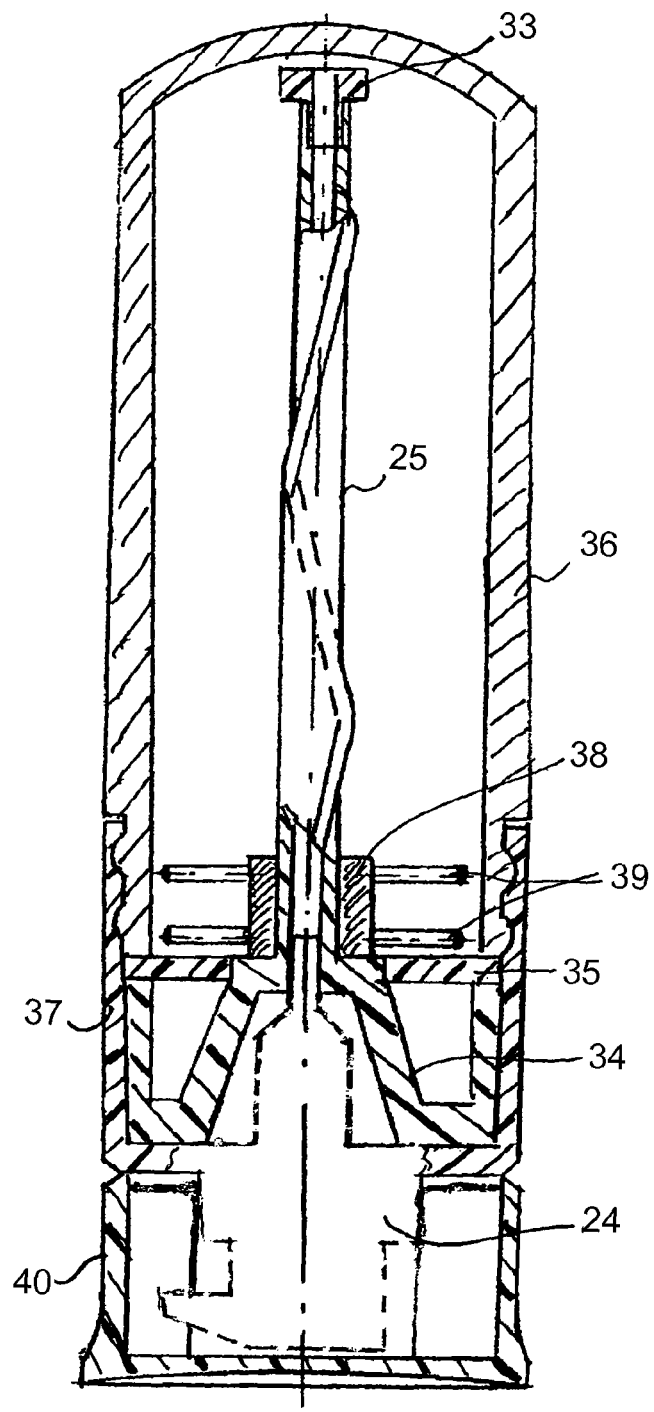
FIG. 3 shows an axial section through a refillable container with a device in accordance with the invention for mixing and with a pumping or metering valve.

In the embodiment according to FIG. 3 too, the hollow threaded spindle 25 is combined with a pumping and metering valve 24. The threaded spindle 25 is in this embodiment too designed in one piece with an attachment 34 which is mounted onto the open end of a bottle 36 or the like with a sealing ring 35 inserted between them. The bottle 36 is provided with an external thread onto which is screwed a collar 37 belonging to the pumping or metering valve 24. After removal of the pumping or metering valve 24, the interior of the bottle 36 is accessible for cleaning and/or refilling.

In the embodiment according to FIG. 3 too, a body 38 provided with an internal thread is guided on the hollow threaded spindle. In the embodiment, the body 38 is made of metal and provided with pin-like mixing and stirring elements 39.

A cap 40 provided with inward-facing ribs is fitted onto the neck of the pumping and metering valve 24 and can serve as the base in this embodiment too.

If the bottle 36 is to be used with the device for mixing in accordance with the invention, it is gripped and turned 180° so that when the cap 40 is removed the pumping and metering valve 24 can be operated. By turning it 180°, it is achieved that the body 38 with its mixing and stirring elements 39 moves in the axial direction on the threaded spindle and at the same time rotates.

The modifications explained using FIG. 1 regarding the design of the threaded spindle and/or of the body arranged on it that moves in the axial direction and at the same time rotates due to pivoting can also be implemented in the same way in the embodiments according to FIGS. 2 and 3.

In a modified embodiment similar to FIG. 1, the outlet element (7) is assigned a valve that closes the pouring opening. This valve, which does not of course have to be very tight, is opened by the body (2) when the container has been turned far enough for the body (2) to move on the threaded spindle (1) to the closure bottom (6). The body (2) opens with its weight the spring-loaded valve. The valve is in one embodiment a slotted diaphragm from which tabs are swung away to open the valve by means of pins or the like attached to the body.

In an embodiment of the invention, the body is made of plastic which has been given a greater mass with weight inlays preferably of metal. The mixing and/or stirring elements have in one embodiment the form of one or more perforated plates preferably subdivided with radial slots. If several perforated plates are provided, they are arranged in an axial spacing. The mixing and/or stirring elements (5), which can be combined with one another in any variant, are preferably elastically shapeable such that they yield when inserted in the radial direction into a container (3), but then expand again in the radial direction. The device in accordance with the invention for mixing is also suitable for cylindrical or oval squeeze bottles. With oval squeeze bottles, two or more threaded spindles (1) parallel to one another are preferably provided with bodies (2) having mixing and/or stirring elements (5).

The invention claimed is:

1. A device for mixing a compound present in a container comprising:
    a threaded spindle stationarily attached inside the container,
    said threaded spindle comprising a body having an internal thread and configured to be moved by pivoting the container about a horizontal axis relative to the threaded spindle,
    said body further having mixing elements, stirring elements, or both, protruding therefrom substantially in a radial direction,
    wherein the threaded spindle is arranged aligned with a pouring opening of a container, and
    wherein a valve unit is assigned to the pouring opening, said valve unit being opened by the body movable on the threaded spindle.

2. The device according to claim 1, wherein the threaded spindle and the body provided with mixing or stirring elements, or both, form a prefabricated structural unit.

3. The device according to claim 1, wherein the pouring opening contains a channel with labyrinth-like course.

4. The device according to claim 1, wherein the body is provided with a sealing attachment assigned to the inlet of the pouring opening.

5. The device according to claim 1, wherein the threaded spindle and the body provided with mixing or stirring elements, or both, form an assembly group with a pumping or metering valve or with the elements of a pouring opening, said assembly group being insertable into an opening of a container.

6. A device for mixing a compound present in a container comprising:
    a threaded spindle stationarily attached inside the container,
    said threaded spindle comprising a body having an internal thread and configured to be moved by pivoting the container about a horizontal axis relative to the threaded spindle,
    said body further having mixing elements, stirring elements, or both, protruding therefrom substantially in a radial direction,
    wherein the threaded spindle is designed tubular and connected at one end to a pumping or metering valve.

7. A device for mixing a compound present in a container comprising:
    a threaded spindle stationarily attached inside the container,
    said threaded spindle comprising a body having an internal thread and configured to be moved by pivoting the container about a horizontal axis relative to the threaded spindle,
    said body further having mixing elements, stirring elements, or both, protruding therefrom substantially in a radial direction,
    wherein a pumping or metering valve is covered by a cap designed as a pedestal for the container.

* * * * *